United States Patent

Sakanaka et al.

[11] Patent Number: 5,850,189
[45] Date of Patent: Dec. 15, 1998

[54] APPARATUS AND METHOD FOR INFRARED COMMUNICATION

[75] Inventors: Jiro Sakanaka, Kawasaki; Astushi Watanabe, Sagamihara; Yoichi Mizukoshi, Fujisawa, all of Japan

[73] Assignee: International Business Machines Corporation, Armonk, N.Y.

[21] Appl. No.: 636,107

[22] Filed: Apr. 22, 1996

[30] Foreign Application Priority Data

May 16, 1995 [JP] Japan ..................... 7-116790

[51] Int. Cl.⁶ ..................... H04B 10/04
[52] U.S. Cl. ............... 340/825.72; 340/825.62; 359/142; 359/184; 341/176; 455/352; 395/891; 375/370
[58] Field of Search ............. 340/825.72, 825.63, 340/825.57, 825.58, 825.62; 359/142, 143, 146, 184; 341/176, 177, 178, 179; 348/734; 455/352; 395/527, 891, 893; 375/354, 362, 369, 370

[56] References Cited

U.S. PATENT DOCUMENTS

| | | | |
|---|---|---|---|
| 4,633,313 | 12/1986 | Mogi et al. | 348/734 |
| 5,247,380 | 9/1993 | Lee et al. | 359/143 X |
| 5,394,259 | 2/1995 | Takahara | 359/142 |
| 5,508,836 | 4/1996 | Decaro et al. | 359/142 X |

*Primary Examiner*—Brian Zimmerman
*Assistant Examiner*—William H. Wilson, Jr.
*Attorney, Agent, or Firm*—Ronald L. Drumheller

[57] ABSTRACT

A transmission mode selector, for changing a transmission mode selector, and a reception mode selector, for changing a reception mode, are added to an infrared communication circuit that conventionally supports an IrDA; and a UART that controls serial communication, is so set in a given condition where communication can be performed with a home electronic appliance remote controller, that a protocol for the home electronic appliances can be emulated by using the infrared communication apparatus of the personal computer.

12 Claims, 5 Drawing Sheets

APPARATUS AND METHOD FOR INFRARED COMMUNICATION

TECHNICAL FIELD

The present invention relates to an apparatus that controls an infrared remote controller for home electronic appliances by using an infrared communication apparatus for a computer system, and to an employment method therefor.

DESCRIPTION OF THE PRIOR ART

As portable personal computers, such as notebook computers, have come to be widely employed, wireless communication, which does not require electric or optical wiring, now tends to be frequently employed for the transfer of data between computers. The main wireless data communication apparatuses are one that uses electric waves and another that uses infrared (IR) light.

A communication system that uses electric waves has such advantages as that with long distance communication is possible, and that it provides a comparatively high transfer speed for data; however, it also has disadvantages in that it is expensive, and in that the majority of nations have enacted individual regulatory statutes to cover the use of electric waves. On the other hand, a communication system that uses infrared light has advantages in that it is inexpensive and its the power consumption is comparatively low, and in that there are almost no regulatory statutes covering its use.

Because of a characteristic difference between a communication system that uses electric waves and a communication system that uses infrared light, personal computers, especially portable notebook computers, tend to employ the communication system that uses the infrared light.

Remote controllers that uses AM modulated infrared light have come to be widely used as transmission means for the remote control of home electronic appliances, such as television sets, audio sets or air conditioners.

Since infrared communication protocols differ for the computer field and for the home electronic appliances field, and since there is no compatibility between them, even though, as is described above, infrared communication has spread independently throughout both fields, it is impossible for personal computers to control the power supplies for home electronic appliances or for remote controllers for home electronic appliances to control personal computers.

An apparatus that uses an infrared communication system for a personal computer as a remote control for a television set, a video deck, etc., is disclosed in Japanese Patent application No. Hei 4-73262, which is filed by Sony Corp. In this apparatus, both a modulator for personal computer communication and a modulator for a remote controller of, for example, a television set are provided independently, and the number of infrared emitting diodes for the emission of infrared light is reduced from two to one merely by both modulators using a single diode in common. Therefore, unlike the present invention, the apparatus does not enable infrared communication with a remote controller by using an infrared communication circuit for a personal computer that originally is incompatible with the remote controller.

SUMMARY OF THE INVENTION

It is one object of the present invention to provide an infrared communication apparatus, for a personal computer system, that provides for unidirectional or bidirectional communication between the infrared communication apparatus and a remote controller for home electronic appliances, and an employment method therefor.

To achieve the above object, a transmission mode selector, for changing a transmission mode, and a reception mode selector, for changing a reception mode, are added to an infrared communication circuit that conventionally supports an IrDA; and a UART that controls serial communication, is so set in a given condition where communication can be performed with a home electronic appliance remote controller, that a protocol for the home electronic appliances can be emulated by using the infrared communication apparatus of the personal computer.

With the above arrangement of the present invention, an infrared communication apparatus for a personal computer and a remote controller for a home electronic appliance, which is incompatible, can mutually engage in data communication.

In FIG. 6 are shown two communication protocols that are employed for the present invention. A UART frame 40 consists of a start bit, a data bit and a stop bit, and the frame as a whole is called an asynchronous frame 46. Supposing that in serial communication the start bit is "0" and the stop bit is "1", data are located between the start bit and the stop bit in order beginning with the LSB through the MSB. In this example, the data bits are "01100101"b (binary)="65"h (hexadecimal) in order that begins with the MSB.

An IR frame 42 is the result obtained by converting the UART frame 40 into the IrDA standard frame. According to the IrDA standard, only when the data are "0s", high (1s) are output at the time length for 3/16 bits 44, and when the data are "1s", nothing is output. The UART frame 40 is converted to the IR frame 42 where 3/16 bits 44 are output for the "0" data.

DESCRIPTION OF THE PREFERRED EMBODIMENT

The preferred embodiments of the present invention will be described in the following order while referring to the accompanying drawings.

The structure and the processing of a wireless communication system according to the present invention will be described by using, for convenience sake, a PC card and a notebook personal computer, which are probably most frequently employed. The present invention is, however, not limited to the application for a PC card and a notebook personal computer, and can be realized with an adaptor card and a large computer system, such as a desktop.

A. System Environment

Figure 1:
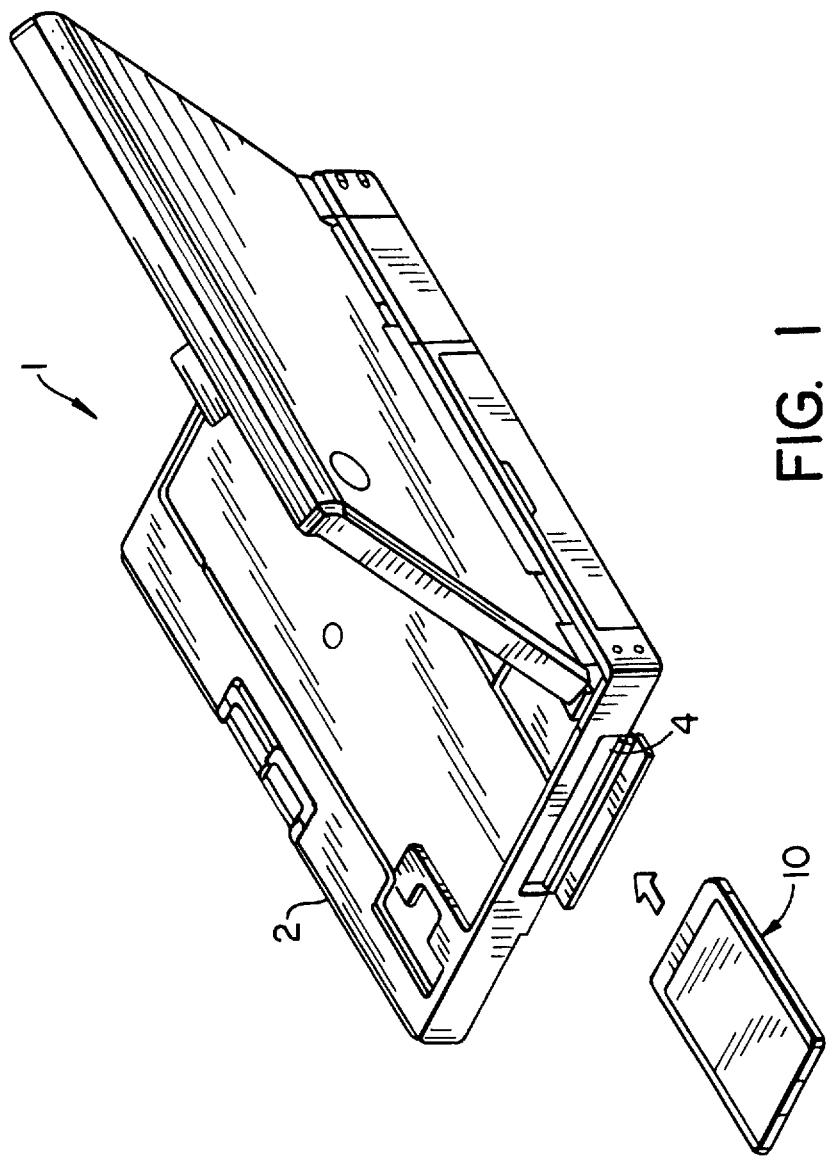
FIG. 1 is a diagram illustrating a computer system that carries out the present invention.

FIG. 1 is a diagram illustrating the entire external appearance of a computer system 1 that carries out the present invention. A body 2 of the computer system 1 is preferably a portable PC as is depicted, but may be a desktop or other PC type, a printer, a facsimile machine, or a communication controller. The details of the computer system 1, such as a keyboard and a display device, are not shown in FIG. 1, because they do not directly relate to the present invention.

A PC card 10 is detachable, and when it is used, it is inserted into a slot 4 in the side face of the body 2. The slot 4 is located at an arbitrary position, and may be provided in the rear face of the PC 1. It is preferable that the specifications for the PC card 10 conform to the PCMCIA or the JEIDA standards.

B. Infrared communication system

Figure 2:
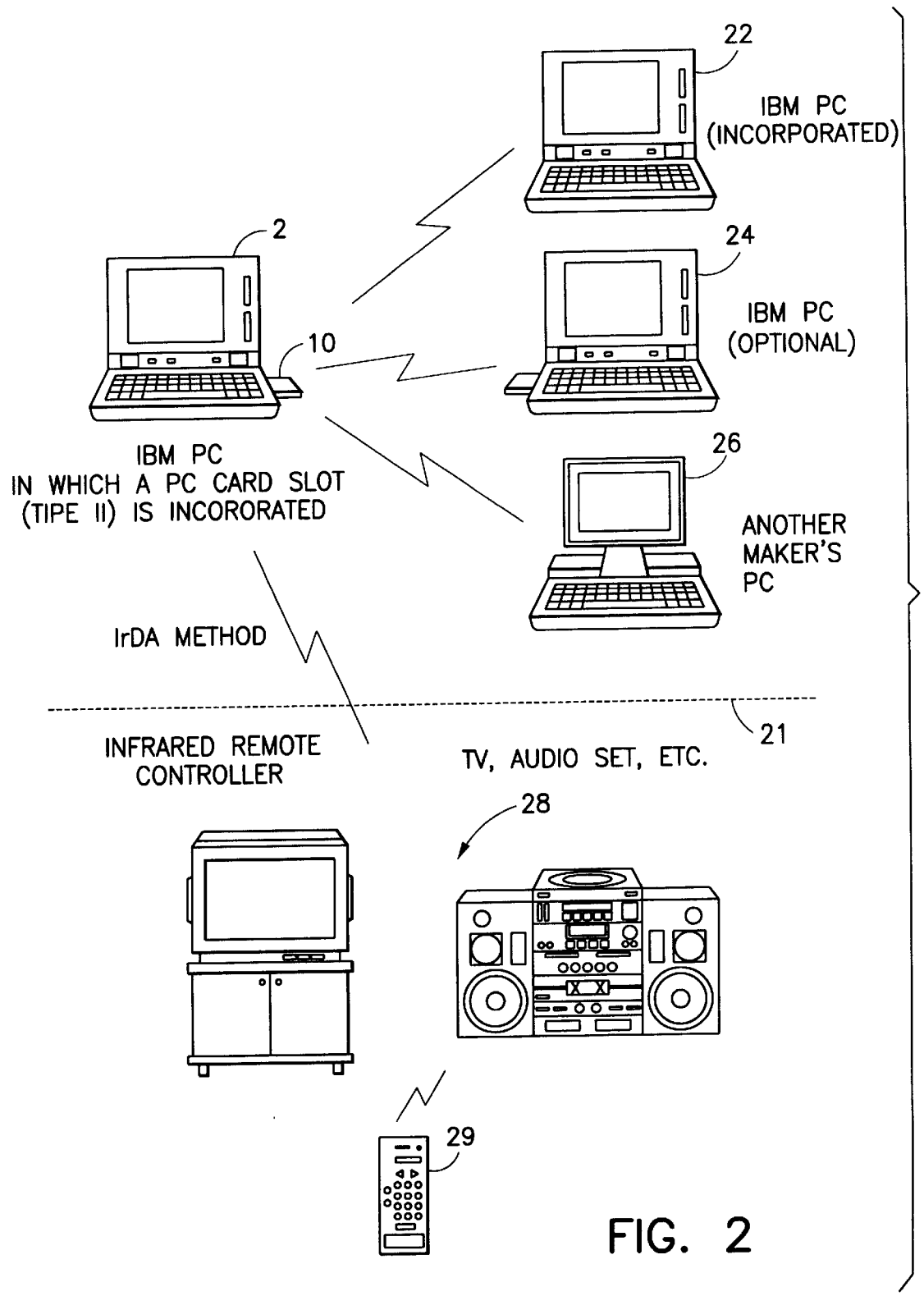
FIG. 2 is a diagram showing an infrared communication system.

FIG. 2 is a diagram illustrating an infrared communication system that uses, as a carrier, the infrared light that is currently employed for personal computers and for home electronic appliances. A diagram depicting data communication among personal computers is shown in a portion above a broken line 21 in FIG. 2. In this communication system, for example, a notebook computer 2 is depicted that uses as an infrared (IR) communication device a PC card shown in FIG. 1. In addition, there are provided an IBM PC 22 that incorporates an IR communication function, an IBM PC 24 that, as does the PC 22, has an optional IR communication function, and a PC 26 by another maker that has an IR communication function.

As the protocol for such IR communication, there is the IrDA 1.0 standard, which is an international standard that is specified by the IrDA (Infrared Data Association). Currently, this standard tends to be employed for personal computers and their associated apparatuses. As long as it conforms to the IrDA standard, a computer can perform IR data communication not only with those computers that are produced by the same maker but also with computers, or other associated products, that are produced by other makers. For example, in FIG. 2, the PC 2 can perform wireless infrared communication with the PCs 22 and 24, and the other maker's PC without a cable being required.

Infrared communication means have also been used as wireless communication control means for home electronic appliances. That is, as is shown in the portion below the broken line 21 in FIG. 2, the powering on and off of and the adjustment of the volume for a television set (TV) or an audio set 28 can be controlled by a remote controller 29.

C. Arrangement and communication protocol of an infrared remote controller

Figure 3:
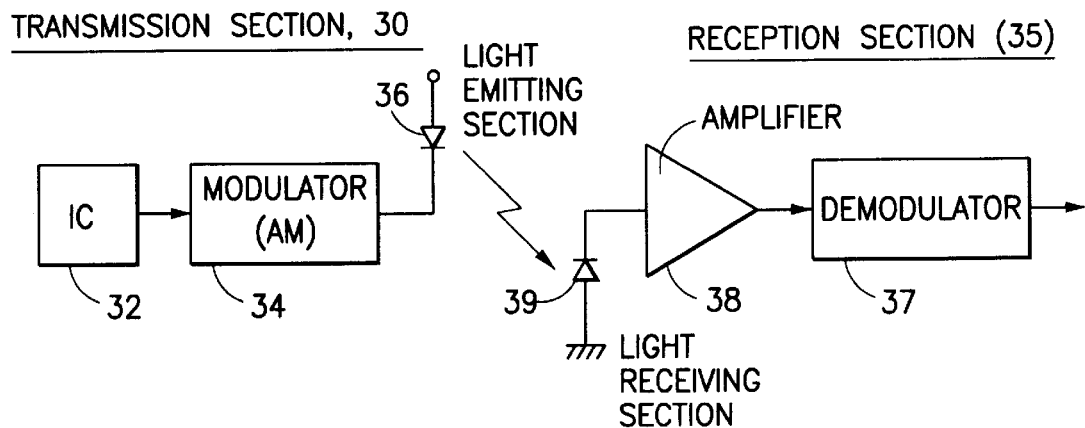
FIG. 3 is a diagram illustrating the structure of an infrared remote controller.

FIG. 3 is a diagram showing the circuit arrangement of a remote controller for home electronic appliances. On the left side in FIG. 3 is shown the circuit arrangement for a transmission section 30 in the remote controller, while on the right side is shown the circuit arrangement for a reception section 35 in the remote controller. The transmission section 30 comprises a control IC 32, for generating a control signal to control a remote controller; a modulator 34, for performing AM modulation of the control signal that is generated by the IC 32; and a light emitting section 36, for converting the modulation signal that is changed by the modulator 34 into infrared light. The reception section 35 comprises a light reception section 39, for receiving infrared light that is transmitted from another remote controller and for converting it into an electric signal; an amplifier 38, for amplifying the electric signal; and a demodulator 37, for demodulating the electric signal that is amplified by the amplifier 38 to provide the original signal as it was before modulation.

Figure 4:
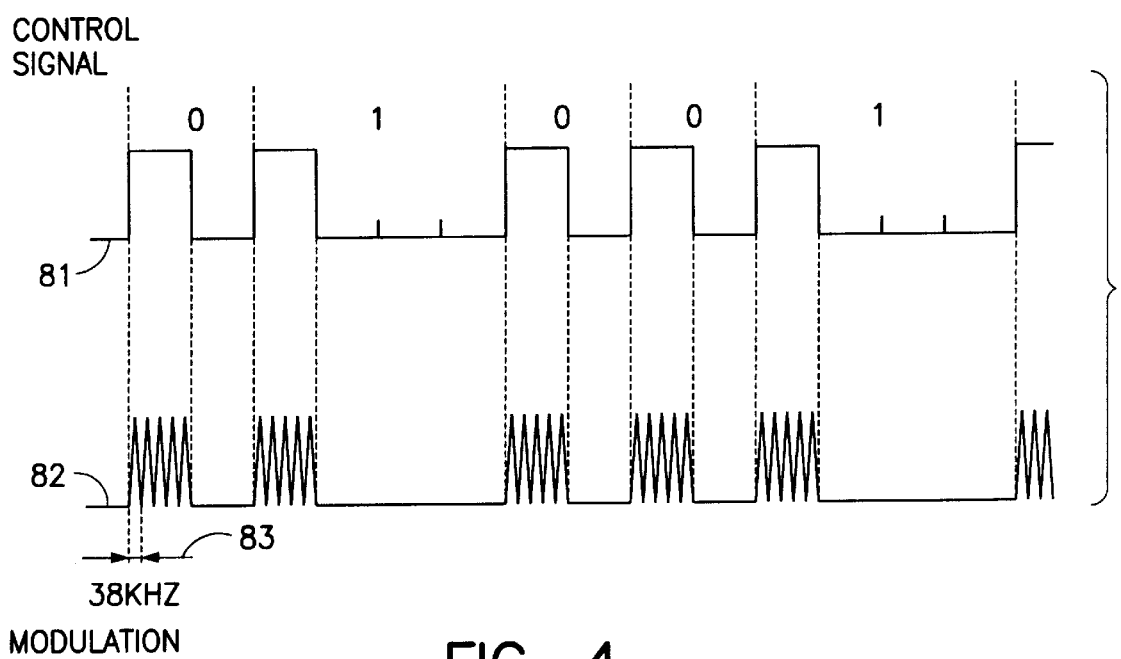
FIG. 4 is a diagram showing a protocol for the infrared remote controller.

FIG. 4 is a diagram showing a common protocol that is employed for a remote controller for home electronic appliances that is structured as is shown in FIG. 3. Suppose that the data "01001"b (binary) is to be transferred by the infrared remote controller. A control signal that is output by the IC 32 and that before modulation has the protocol as is indicated by 81 in FIG. 4. In other words, for this protocol, data "0" is represented by a high level (1) and a succeeding low level (0) that have equal lengths. Data "1" is represented by a high level (1) and a low level (0) that is three times longer than the high level (1). According to this protocol, the time that is required for transferring "1" is twice as long as that which is required for transferring "0".

The control signal 81 is modulated by the AM modulator 34. Reference number 82 denotes a modulation signal that is acquired by modulating the control signal.

In this case, 38 kHz 83 is used as a common modulation frequency. In other words, with a control signal 81 for a high level (1), a sub carrier of 38 kHz is output, and with a control signal 81 for a low level (0), a sub carrier of 38 kHz is not output. Therefore, the control signal 81 is modulated to the modulation signal 82, which is in turn output.

D. Arrangement and communication protocol of the present invention

Figure 5:
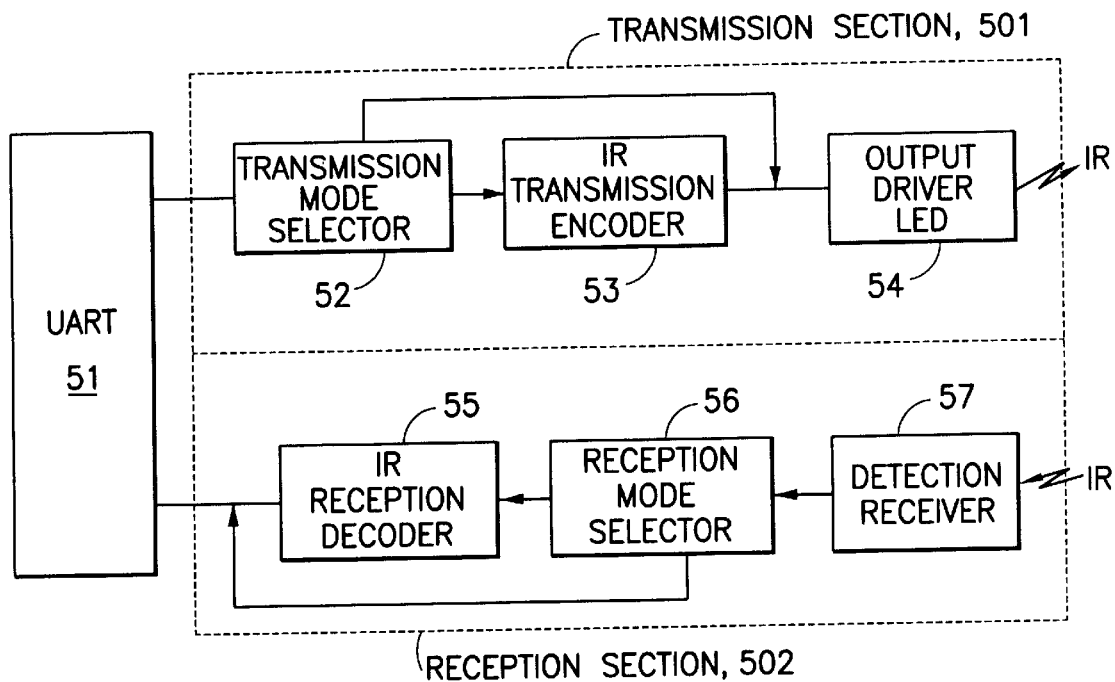
FIG. 5 is a diagram illustrating the arrangement of the present invention.
Figure 6:
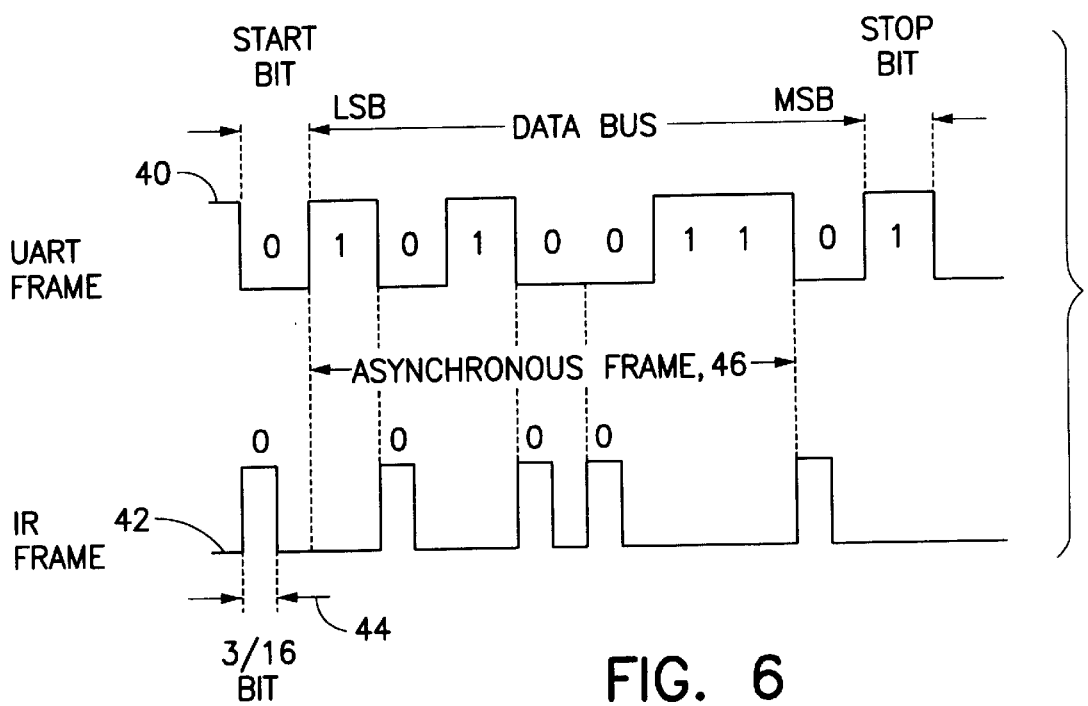
FIG. 6 is a diagram showing an IrDA protocol.

FIG. 5 is a diagram showing the circuit arrangement of the present invention. A transmission section 501 and a reception section 502 are connected by a UART (Universal Asynchronous Receiver-Transmitter) 51, which serves as a communication controller. The UART 51 performs the parallel transfer of data with the processor of the computer system 1 and controls asynchronous serial communication.

The transmission section 501 includes a transmission mode selector 52, an IR transmission encoder 53, and an output driver LED 54. The transmission mode selector 52 determines from the setup of a register whether the data that are transmitted by the UART 51 are output to the IR transmission encoder 53 or directly to the output driver LED 54. The IR transmission encoder 53 encodes the data that are transmitted from the UART 51 via the transmission mode selector 52, and the output driver LED 54 converts, into infrared data, the data that are transmitted from the transmission mode selector 52 or the IR transmission encoder 53.

The reception section 502 includes a detection receiver 57, a reception mode selector 56, and an IR reception decoder 55. The detection receiver 57 detects infrared data that are sent from another computer system and converts the data into an electric signal. The reception mode selector 56 selectively outputs, depending on the setup of a register, the electric signal, which is obtained by the conversion in the detection receiver 57, to either the IR reception decoder 55 or the UART 51. The IR reception decoder 55 decodes the electric signal that is received from the reception mode selector 56.

E. Embodiment 1

Figure 7:
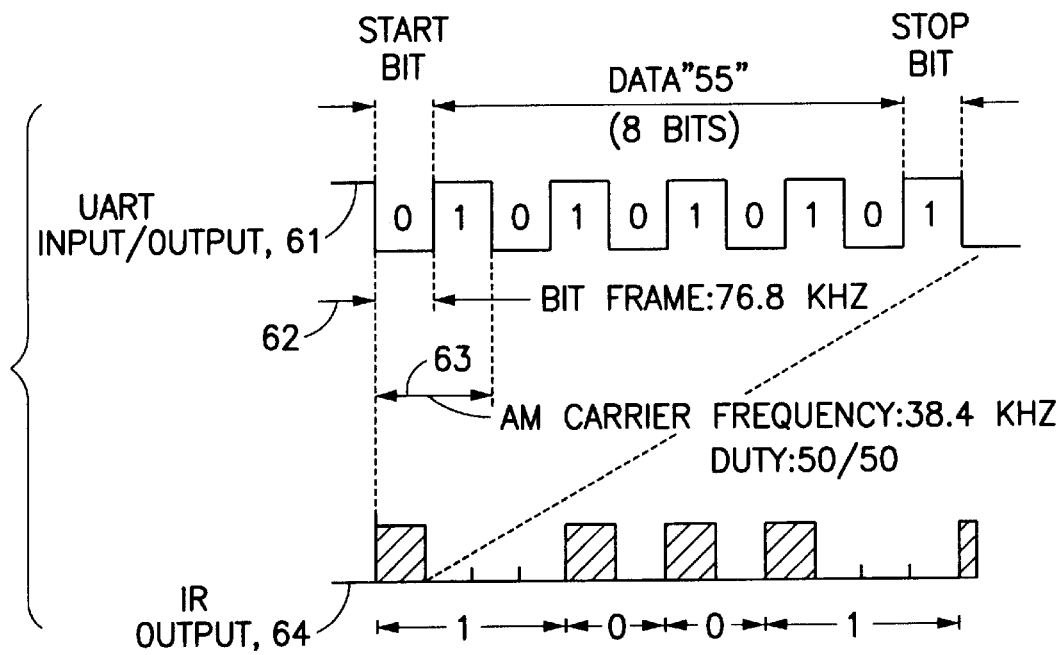
FIG. 7 is a graph showing Embodiment 1.

A first embodiment of the present invention will now be explained while referring to FIG. 7. With the above described arrangement of the present invention, the UART mode or the IrDA mode can be selected as a transmission/reception mode according to the designations for the transmission mode selector 52 and the reception mode selector 56. The embodiment when the UART mode is selected is shown in FIG. 7.

In the UART mode, the transfer rate (Baud rate) of the UART 51 is set to 76.8 kHz, the data length is 8 bits, and the stop bit is "1". Under these conditions, a data pattern "55" that is output is indicated by a UART input/output signal 61 in FIG. 7. More specifically, as "0s" and "1s" are alternately arranged from the start bit to the stop bit, and as a one-bit frame of a "0" or a "1" is set to 76.8 kHz, one wavelength 63 that consists of a "01" is 38.4 kHz, one half of 76.8 kHz, and the duty ratio is 50:50 (high:low). The IR output 64 can be provided by using the asynchronous frame 61 at predetermined intervals according to the protocol in FIG. 4, and the modulation signal 82 of the remote controller for home electronic appliances can be emulated.

F. Embodiment 2

Figure 8:
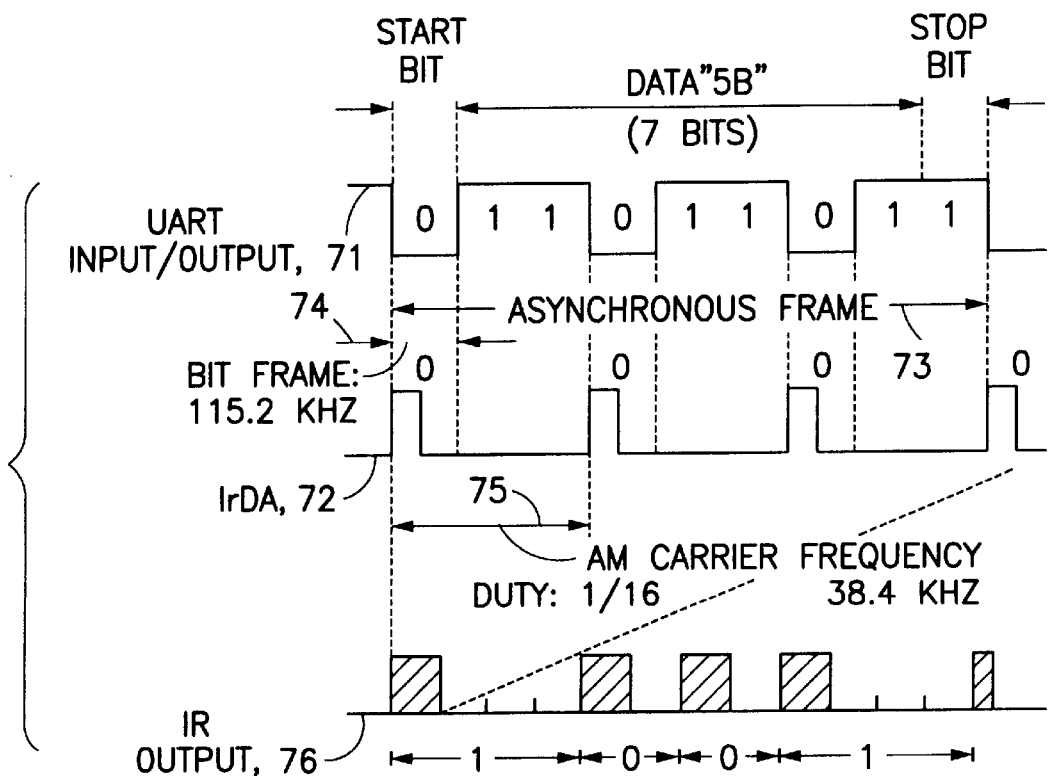
FIG. 8 is a graph showing Embodiment 2.

A second embodiment of the present invention will now be described while referring to FIG. 8. Unlike the first embodiment, the transmission mode selector 52 and the reception mode selector 56 are set to the IrDA mode. In the IrDA mode, the transfer rate (Baud rate) of the UART 51 is set to 115.2 kHz, the data length is 7 bits, and the stop bit is "1". When data pattern "5B" is output under these conditions, a UART input/output signal 71 in FIG. 8 is output by the UART 51. More specifically, as a three bit pattern of "011" is continued from the start bit to the stop bit, and as a one-bit frame of a "0" bit or a "1" bit is set to 115.2 kHz, one wavelength 75 that consists of a "011" set is 38.4 kHz, one third of 115.2 kHz, and the duty ratio is 1:2 (high:low).

The UART output signal 71 is transmitted to the IR transmission encoder 53, which converts the signal 71 into the IrDA signal. In other words, only when the data are "0s", the high (1) output ³⁄₁₆ bits are generated and the UART output signal 71 converted into an IrDA signal 72. The IrDA signal has the same wave length as that of the UART output signal 71, 38.4 kHz, and the duty ratio is 1:16 (high:low) because of the IrDA conversion. Therefore, an IrDA output 76 can be provided by using the asynchronous frame 73 at predetermined intervals, and the modulation signal 82 of the remote controller for home electronic appliances in FIG. 4 can be emulated.

In the first and second embodiments, mainly the processing for the IR transmission has been explained. For the IR reception, the processing that is performed by the transmission section 501 is inversely performed in the arrangement for the reception section 502 (FIG. 5), so that the infrared protocol for home electronic appliances can be emulated for the IR reception.

As is described above, according to the structure of the present invention, the IR communication function, for a personal computer, that is conventionally incompatible with that of a remote controller for a home electronic appliance is employed as a predetermined setup in the UART mode and in the IrDA mode, so that a personal computer can perform either the unidirectional or bidirectional communication with a remote controller for a home electronic appliance.

Having thus described our invention, what we claim as new and desire to secure by letters patents is:

1. Apparatus for using a computer IR communication system having a UART to send an IR remote control signal to a home electronic appliance having an IR controller, the IR controller of the home electronic appliance being responsive to a modulated control signal having a predetermined protocol, the modulated control signal having a predetermined modulation period, comprising:

means for setting the UART to output a predetermined data value at a predetermined bit frequency during enabled intervals, the predetermined data value and predetermined bit frequency being selected so as to form a periodic signal at the output of the UART during enabled intervals, the periodic signal having a period corresponding to said predetermined modulation period; and means for selectively enabling the UART to output the predetermined data value at the predetermined bit frequency during enabled intervals in accordance with a control signal having the predetermined protocol recognized by the IR controller, whereby an IR remote control signal is produced for a home electronic appliance.

2. Apparatus as in claim 1 wherein the UART is enabled during each "1" bit of the control signal having the predetermined protocol.

3. Apparatus as in claim 1 wherein the predetermined data value corresponds to alphanumeric value 55.

4. Apparatus as in claim 1 wherein the predetermined data value corresponds to alphanumeric value 5B.

5. Apparatus as in claim 1 wherein the output of the UART is converted in accordance with the IrDA standard to produce the IR remote control signal.

6. Apparatus as in claim 1 wherein the UART may be used in an alternative mode of operation to communicate with another computer or a computer peripheral.

7. A method of using a computer IR communication system having a UART to send an IR remote control signal to a home electronic appliance during a remote control mode of operation, the home electronic appliance having an IR controller responsive to a modulated control signal having a predetermined protocol, the modulated control signal having a predetermined modulation period, comprising the steps of:

setting the UART to output a predetermined data value at a predetermined bit frequency during intervals in which the UART output is enabled in the remote control mode of operation, the predetermined data value and predetermined bit frequency being selected so as to form a periodic signal at the output of the UART during intervals in which the UART output is enabled in the remote control mode of operation, the periodic signal having a period corresponding to said predetermined modulation period; and selectively enabling the UART to output the predetermined data value at the predetermined bit frequency during intervals in the remote control mode of operation in accordance with a control signal having the predetermined protocol recognized by the IR controller, thereby producing an IR remote control signal for a home electronic appliance in the remote control mode of operation.

8. A method as in claim 7 wherein the UART is enabled during each "1" bit of the control signal having the predetermined protocol.

9. A method as in claim 7 wherein the predetermined data value corresponds to the alphanumeric value 55.

10. A method as in claim 7 wherein the predetermined data value corresponds to the alphanumeric value 5B.

11. A method as in claim 7 wherein the UART output is converted in accordance with the IrDA standard to produce the IR remote control signal.

12. A method as in claim 7 wherein the UART has a second mode of operation during which the UART is used to communicate with another computer or a computer peripheral.

* * * * *